US012325616B2

(12) United States Patent
Cavazos et al.

(10) Patent No.: US 12,325,616 B2
(45) Date of Patent: Jun. 10, 2025

(54) METHOD AND APPARATUS FOR CONFIGURING AND MAINTAINING A BEVERAGE DISPENSER

(71) Applicant: Lancer Corporation, San Antonio, TX (US)

(72) Inventors: Joshua Anthony Cavazos, San Antonio, TX (US); Roy D. Cole, Live Oak, TX (US)

(73) Assignee: Lancer Corporation, San Antonio, TX (US)

( * ) Notice: Subject to any disclaimer, the term of this patent is extended or adjusted under 35 U.S.C. 154(b) by 0 days.

(21) Appl. No.: 18/377,886

(22) Filed: Oct. 9, 2023

(65) Prior Publication Data

US 2024/0034611 A1 Feb. 1, 2024

Related U.S. Application Data

(63) Continuation of application No. 17/687,178, filed on Mar. 4, 2022, now Pat. No. 11,802,038.

(60) Provisional application No. 63/157,472, filed on Mar. 5, 2021.

(51) Int. Cl.
*B67D 1/08* (2006.01)
*B67D 1/12* (2006.01)
*F25C 5/20* (2018.01)

(52) U.S. Cl.
CPC ......... *B67D 1/0855* (2013.01); *B67D 1/0888* (2013.01); *B67D 1/1211* (2013.01); *F25C 5/20* (2018.01); *F25C 2400/08* (2013.01)

(58) Field of Classification Search
CPC .. B67D 1/0855; B67D 1/0888; B67D 1/1211; B67D 2210/00118; B67D 1/0036; B67D 1/0037; F25C 5/20; F25C 2400/08
See application file for complete search history.

(56) References Cited

U.S. PATENT DOCUMENTS

2009/0069947 A1* 3/2009 Newman .............. B67D 1/0878 222/144.5
2011/0073212 A1* 3/2011 Erbs ........................ G01G 19/30 141/83
2014/0130890 A1* 5/2014 Chase ........................ F25D 1/02 137/15.05
2014/0188271 A1* 7/2014 Hernandez ............ G06F 3/0488 700/232
2016/0229678 A1* 8/2016 DiFatta ................... G06F 3/011
(Continued)

FOREIGN PATENT DOCUMENTS

CA 2737132 C * 8/2013 ........... B67D 1/0021
CN 2133569 Y * 5/1993
CN 102985354 A * 3/2013 ........... B67D 1/0888
(Continued)

*Primary Examiner* — Bob Zadeh
(74) *Attorney, Agent, or Firm* — Dennis Braswell; Christopher L. Makay

(57) ABSTRACT

A method and apparatus for configuring and maintaining a beverage dispenser (10) are provided in which an array of flow control icons (60) is presented on the same page as functional sections (62-68). The functional sections (62-68) allow assignment of a beverage component to a flow control element corresponding to a selected flow control icon, and other functions to be performed in connection with the assigned beverage component or flow control element.

20 Claims, 11 Drawing Sheets

(56) References Cited

U.S. PATENT DOCUMENTS

| | | | | |
|---|---|---|---|---|
| 2019/0178556 | A1* | 6/2019 | Scalf | F25D 23/028 |
| 2020/0100616 | A1* | 4/2020 | Herbert | A47J 31/41 |

FOREIGN PATENT DOCUMENTS

| | | | | | |
|---|---|---|---|---|---|
| CN | 113188282 | A | * | 7/2021 | F25C 1/00 |
| JP | 2001328700 | A | * | 11/2001 | |

* cited by examiner

66

68

METHOD AND APPARATUS FOR CONFIGURING AND MAINTAINING A BEVERAGE DISPENSER

CROSS-REFERENCE TO RELATED APPLICATION AND PRIORITY INFORMATION

This application is a continuation of pending U.S. patent application Ser. No. 17/687,178, entitled "Method and Apparatus for Configuring and Maintaining a Beverage Dispenser", filed Mar. 4, 2022, which claims the benefit of and priority from prior filed U.S. provisional application No. 63/157,472, entitled "Method and Apparatus for Configuring and Maintaining a Beverage Dispenser", filed Mar. 5, 2021, both of which are incorporated herein by reference in their entirety.

TECHNICAL FIELD OF THE INVENTION

This invention relates generally to dispensers and dispensing, and in particular to a method and apparatus for configuring and maintaining a beverage dispenser.

BACKGROUND OF THE INVENTION

Advances in the beverage dispensing arts have increased the number and kind of beverages that may be dispensed by a dispenser. With this increased flexibility comes complexity, both in configuring (whether initially or later) and maintaining the dispenser. To perform their tasks, personnel involved in configuring and maintaining the dispenser are often confronted with a difficult array of choices and steps, and this difficulty increases time spent, chances for error, and the likelihood that the tasks are avoided or postponed.

SUMMARY OF THE INVENTION

In accordance with the teachings of the present invention, a method and apparatus for configuring and maintaining a beverage dispenser are provided which eliminate or substantially reduce problems associated with prior art systems.

In a particular embodiment, a beverage dispenser system is provided which includes a plurality of beverage component flow control elements each coupled to a respective beverage component, a water flow control element coupled to a source of water, a user interface, and a controller coupled to the flow control elements and the user interface. The controller is operable to cause a non-customer user page to be presented on the user interface having a plurality of selectable flow control icons, each corresponding to a respective one of the beverage component flow control elements, and a plurality of selectable beverage component icons each corresponding to one of the beverage components. The controller is operable to associate information related to the beverage component corresponding to a selected beverage component icon with the beverage component flow control element corresponding to a selected beverage component flow control icon such that, to dispense a requested beverage formed of a particular beverage component, the controller is operable to control the flow control element with which the particular beverage component's information has been associated.

In a particular embodiment, the beverage component icons are located in a functional section of the non-customer user interface, spaced apart from the flow control icons. Also, the non-customer user page may comprise a plurality of functional sections spaced apart from the flow control icons, wherein the beverage component icons are located in one of the functional sections. In another embodiment, another of the functional sections may include selectable options related to the beverage component whose information is associated with the flow control element corresponding to the selected flow control icon. The information may include, without limitation, graphical information or information about the ratio of water to the beverage component used to form a finished beverage.

In particular embodiments, the controller is operable to cause to be presented, on a customer user interface of the user interface, for beverages formed of one or more beverage components, beverage selection options for only those beverages for which corresponding beverage component information has been associated with flow control elements.

Furthermore, the non-customer user page may also include an ice type selection, with the controller being further operable to adjust a beverage component to water ratio of a beverage based on the type of ice selected. In another embodiment, the controller is further operable to adjust a duration of beverage component dispensing or a duration of ice dispensing based upon type of ice selected.

Also provided is a method of configuring a beverage dispenser system that comprises displaying, on a page, a plurality of selectable flow control icons each corresponding to a respective beverage component flow control element, receiving a selection of one of the flow control icons, displaying on the page, in response to receiving the selection of one of the flow control icons, a plurality of selectable beverage component icons each corresponding to a respective beverage component, and assigning one of the beverage components to the flow control element corresponding to the selected flow control icon in response to receiving a selection of the beverage component icon corresponding to the beverage component to be assigned, such that information related to the assigned beverage component is associated with the flow control element corresponding to the selected flow control icon.

In one embodiment, the method further comprises locating the beverage component icons on the page in a functional section spaced apart from the flow control icons. Also, the method may further comprise displaying a plurality of functional sections spaced apart from the flow control icons, wherein the beverage component icons are located in one of the functional sections, and may further comprise displaying, in another of the functional sections, selectable options related to the assigned beverage component. Also, functionally related selectable options may be displayed in one or more of the functional sections.

The information may include, without limitation, graphical information or information about the ratio of water to the beverage component used to form a finished beverage. In one embodiment, the method further comprises applying the graphical information to the selected flow control icon.

Also, the page may include an ice type selection, and the method may further comprise adjusting a beverage component to water ratio of a beverage based on the type of ice selected. The method may further comprise adjusting a duration of beverage component dispensing or a duration of ice dispensing based upon type of ice selected.

Important technical advantages are provided by the present invention. In particular, and without limitation, time and "clicks" required for configuration and other tasks are reduced, and efficiency and accuracy are promoted.

BRIEF DESCRIPTION OF THE DRAWINGS

Reference is made in the description to the following briefly described drawings, which are not drawn to scale, and in which like reference numerals indicate like features.

DETAILED DESCRIPTION OF THE INVENTION

Figure 1:
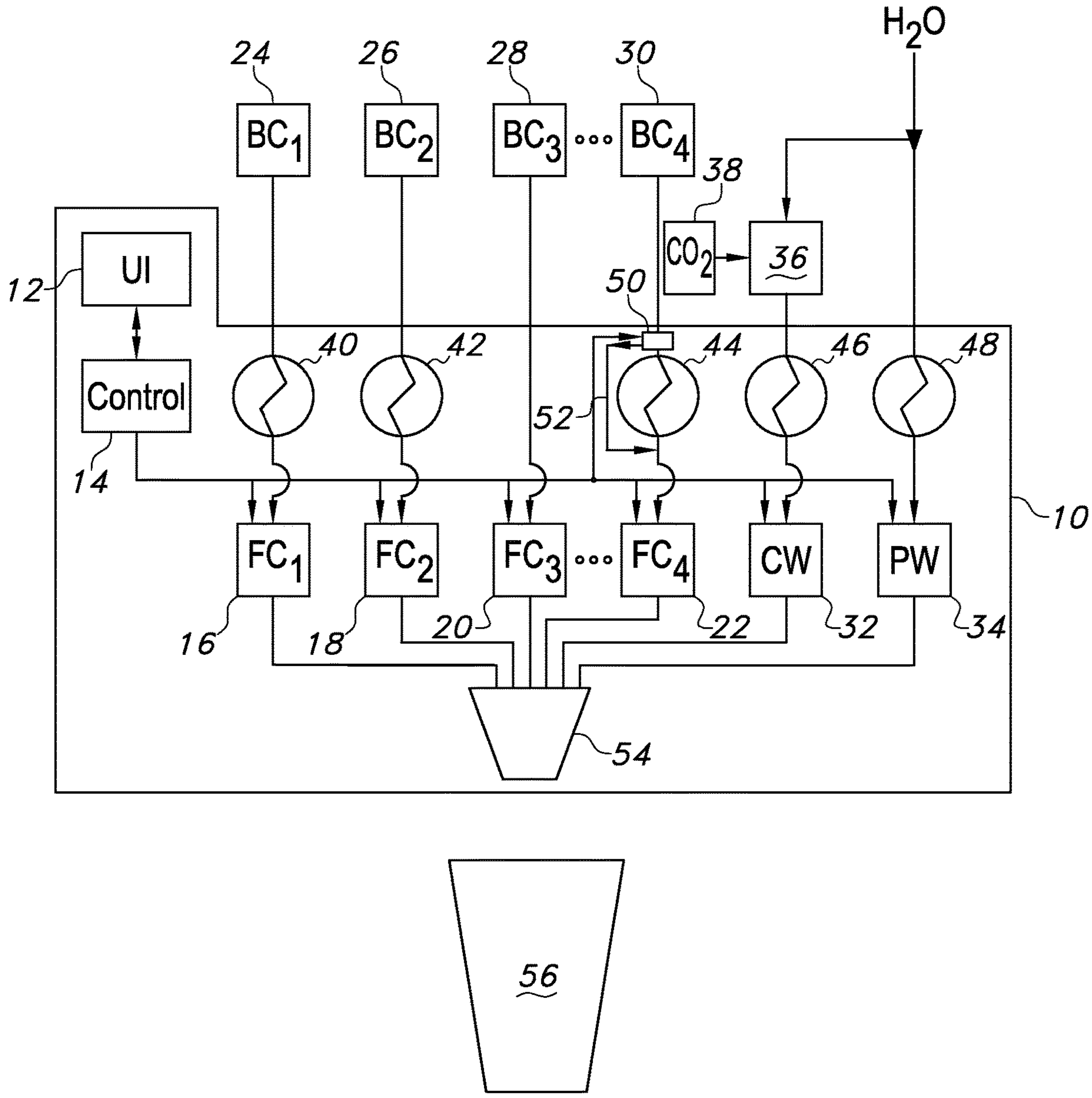
FIG. 1 illustrates one embodiment of a beverage dispenser according to certain aspects of the present invention.

FIG. 1 illustrates one embodiment of a beverage dispenser 10 and overall beverage dispenser system according to certain aspects of the present invention. Beverage dispenser 10 includes a user interface 12 coupled to controller 14. User interface 12 may be any suitable interface, including, without limitation, a touch screen. As another example, user interface 12 may be a display combined with other input devices, such as, without limitation, a keyboard, computer mouse or pointer, stylus, voice recognition, or a smart phone. The user interface 12 is shown as part of dispenser 10, but may reside outside the dispenser (for example, and without limitation, on a user's smart phone, tablet, or computer).

Controller 14 is any suitable controller, for example, and without limitation, a microprocessor-based control system, and may be centralized, distributed, or any combination thereof. Controller 14 performs various control functions, including, without limitation, causing information to be presented to users through user interface 12, receiving information through user interface 12, causing beverages to be dispensed, configuring dispenser 10, and performing maintenance and other operations. To perform this control, controller 14 is coupled to various elements of dispenser 10 as will be discussed below.

Controller 14, through user interface 12, causes beverage selection and dispense information to be presented to customers, and, in response to customer choices, causes the chosen beverages to be dispensed. Non-customers, such as, without limitation, technicians and dispenser-owner representatives, also use user interface 12 to configure dispenser 10 and to perform maintenance and other operations. Discussed below is a method and apparatus for displaying and receiving non-customer information. Before discussing that method and apparatus, elements of one embodiment of a suitable dispenser 10 will be discussed.

Dispenser 10 includes one or more flow control elements 16, 18, 20, and 22 ($FC_1$, $FC_2$, $FC_3$, and $FC_n$) for beverage components. The beverage components may be, for example and without limitation, syrups, concentrates, pre-mixed beverages, bonus flavors, additives, sweeteners, or any other beverage component. The number of flow control elements depicted is for an example only, and more or fewer may be included. The beverage components are supplied from respective beverage component supplies 24, 26, 28, and 30 ($BC_1$, $BC_2$, $BC_3$, and $BC_n$). More or fewer beverage component supplies may be included. In the particular example shown, the supplies 24-30 are shown as being outside of beverage dispenser 10; however, some or all of the beverage component supplies may be located within beverage dispenser 10. The beverage component supplies may comprise any suitable supply, for example and without limitation, bag-in-box containers, bulk storage, or cartridges. Not depicted are pumps or other supply components that may be used to draw the beverage components from their containers for dispensing by dispenser 10.

Also shown are flow control elements 32 and 34 (CW and PW), which, as will be discussed, are for carbonated water and plain water, respectively. Although one flow control element each is shown for carbonated and plain water, more than one of such elements may be included for either or both the carbonated and plain water supplies. Carbonated water is supplied from carbonator 36, which produces carbonated water from $CO_2$ delivered from $CO_2$ supply 38 and water received from a water supply (such as, without limitation, municipal or private water supply, or from an on-site water treatment or supply system). In the particular example shown, carbonator 36 is shown as being outside of beverage dispenser 10; however, it may be located within beverage dispenser 10. Plain water is delivered from the water supply.

Each of the flow control elements ($FC_1$-$FC_n$, CW and PW) may comprise any suitable device or devices for controlling flow, for example and without limitation, an on/off valve, a flow control valve (whether flow rates are controlled electronically or otherwise), a metering valve, a metering pump, or any combination thereof. Each of the flow control elements need not be the same kind of device as the others, but some or all of them may be. The flow control elements are coupled to controller 14, which controls them to allow the appropriate beverages to be dispensed.

Also shown are heat exchanger elements 40-48. The heat exchanger elements 40-48 may be used to cool or heat the associated beverage component or water. The heat exchanger elements are shown upstream of the flow control elements, but some or all of them may be downstream. Also, the heat exchanger elements need not be distinct, separate elements, but may be. For example, and without limitation, a common cold plate or common ice water bath may be used to cool each beverage component and water supply by running its respective line through the plate or bath. As shown in FIG. 1, beverage component supply 28 ($BC_3$) is dispensed at ambient temperature (its supply line does not pass through a heat exchanger). This is shown by way of example, and none or any number of the beverage components or water supplies may be dispensed at ambient temperature. The ambient option for any supply line (whether for water or a beverage component) may be created by using a dedicated line, or by a configurable bypass around the heat exchanger. By way of example, a valve 50 may divert a beverage component $BC_n$ around heat exchanger 44 via line 52, in response to control from controller 14. The configurable bypass option may be included on any supply line (beverage component or water).

In response to a customer beverage dispense selection, controller 14 controls the appropriate flow control element (s) to open (or otherwise supply), and any other components (such as, without limitation, valve 50), thus allowing the appropriate beverage component and/or water to flow to nozzle 54 for dispensing into a container, such as cup 56. Although one multi-flavor nozzle 54 is illustrated, more than one may be used. Each nozzle may be coupled to some or all of the flow control elements. Also, multiple single flavor nozzles, each associated with one or more flow control elements, may also be used As mentioned previously, the beverage dispenser 10 is also used by non-customers, for configuration, maintenance, and other functions. FIGS. 2-11 illustrate a configuration and maintenance user interface for such non-customer users. Controller 14 causes information to be displayed on the user interface for such non-customer users, and receives information through the user interface. A user's selections are received by the controller 14 and used for various purposes, and discussed below.

Figure 2:
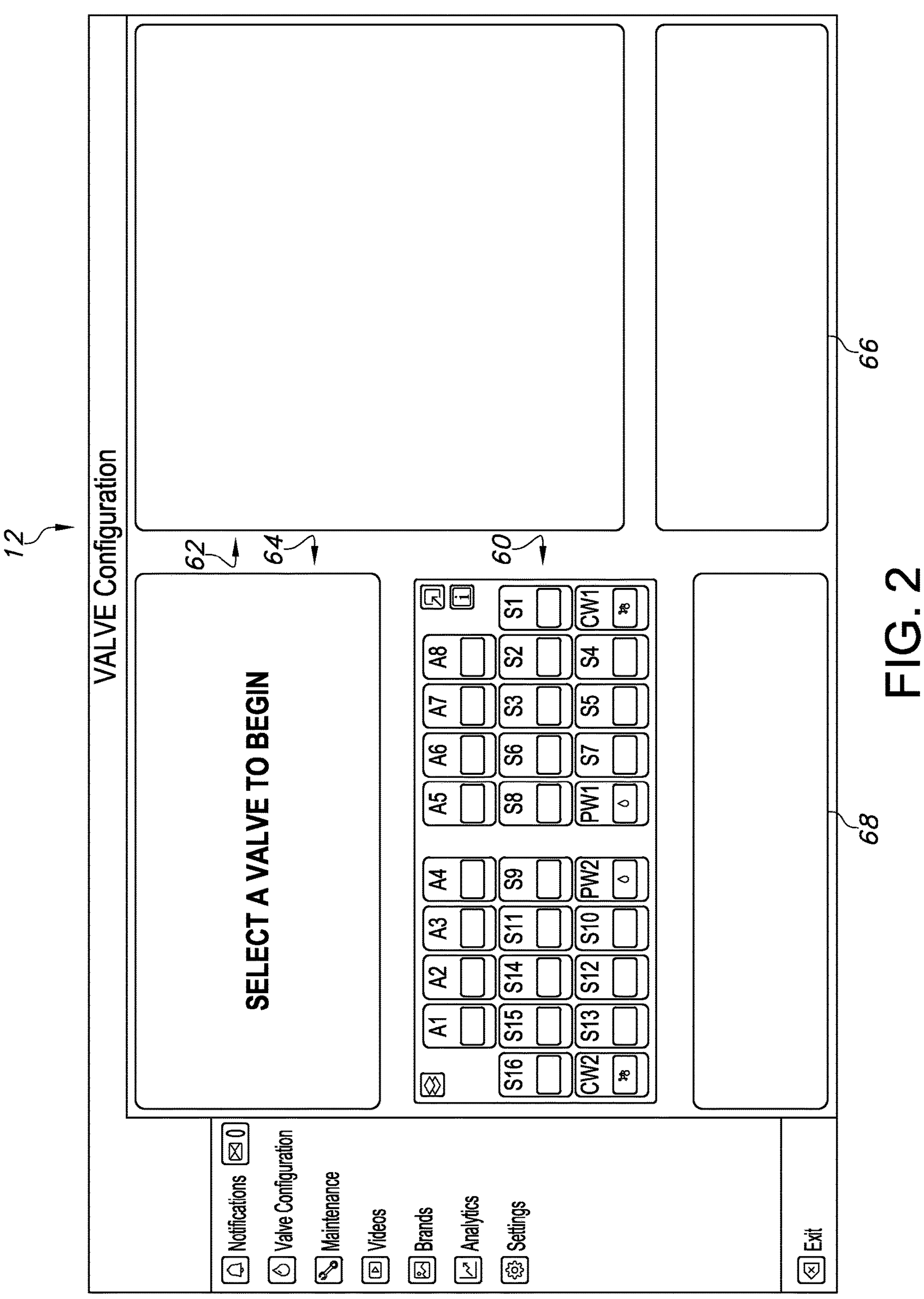
FIG. 2-11 illustrate a configuration and maintenance user interface according to particular aspects of the present invention.

The non-customer user interface may include many functions and resources, and may comprise many distinct pages to be accessed and displayed. The present invention is directed to a particular part of the non-customer user interface that is displayed and used as a single page. As shown in FIG. 2, the non-customer user interface of the present invention first presents an array 60 of selectable flow control icons, each corresponding to one of dispenser 10's flow control elements. Although an array is shown, the icons may be presented in any desired arrangement. "Icon" is used herein to mean any indication of the thing represented, including, without limitation, a graphic or graphical representation, text, a button, a radio button, a menu item, a geometric shape, or any combination of elements. In the particular example shown in FIG. 2, the icons are arranged in a default manner that tracks common configurations of dispenser 10. In this common configuration, icons A1-A8 represent bonus flavor (such as, without limitation, cherry and lime) flow control elements; icons S1-S16 represent beverage syrup/concentrate flow control elements; icons CW1 and CW2 represent carbonated water flow control elements; and icons PW1 and PW2 represent plain water flow control elements. However, even with this default arrangement, each flow control element may be or can be plumbed, physically, to something other than that which is represented in the default scheme, and, as will be shown below, can be easily configured to match the physical plumbing, even if different than envisioned by the default arrangement. The flow control icons may be displayed in an arrangement that matches the physical layout of the flow control elements (e.g., the left-most flow control icon corresponds with the left-most flow control element, and so on).

FIG. 2 also shows functional sections 62, 64, 66, and 68 (array 60 also is located in a functional section of the user interface) of the non-customer user interface, each displayed on the same page. As will be discussed below, these functional sections provide options for configuring the dispenser 10 or performing maintenance or other functions. The number of, options in, and arrangement of these functional sections shown is for example only, and more or fewer, in different locations, may be used, each with the more, fewer, or different functions. In the initial presentation of the non-customer user interface, these functional sections 62-68 may, but need not, be blank, grayed out, or disabled. The functional sections may have borders to help organize them and assist in easily using the interface. In a preferred embodiment, the options and information in each functional section are logically related, so that each functional section is used to perform related functions. For example, in the non-limiting examples shown in the following FIGUREs, section 62 is for beverage component (or water) assignment, section 64 relates to beverage component issues, section 66 relates to ratio and calibration, and section 68 is for checking configurations by dispensing, and for rinsing, priming, and purging.

As can be seen in FIG. 2, instructions may also be provided via the user interface, such as "SELECT A VALVE TO BEGIN". In this example message, "valve" refers to a flow control element.

Figure 3:
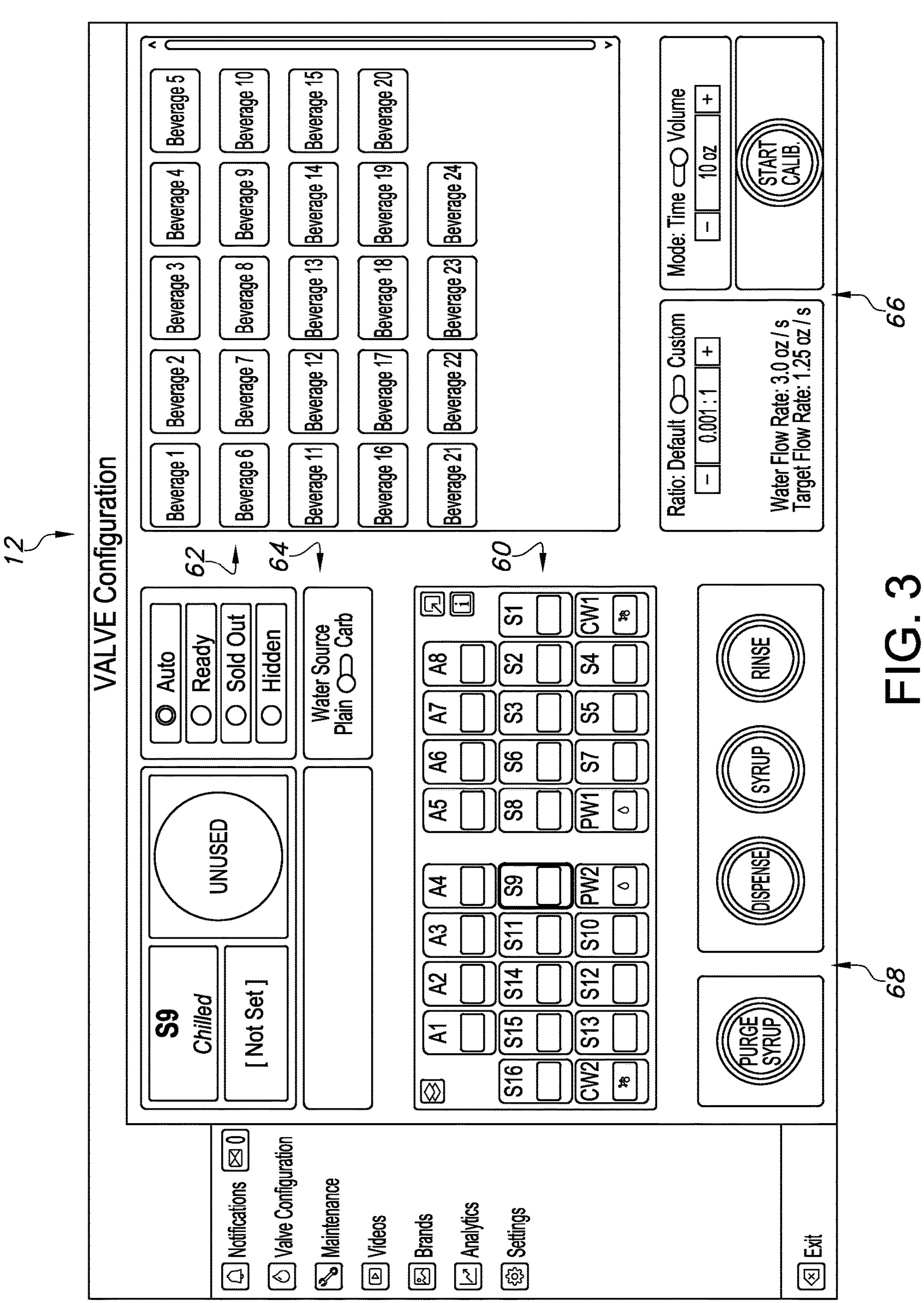
Figure 4:
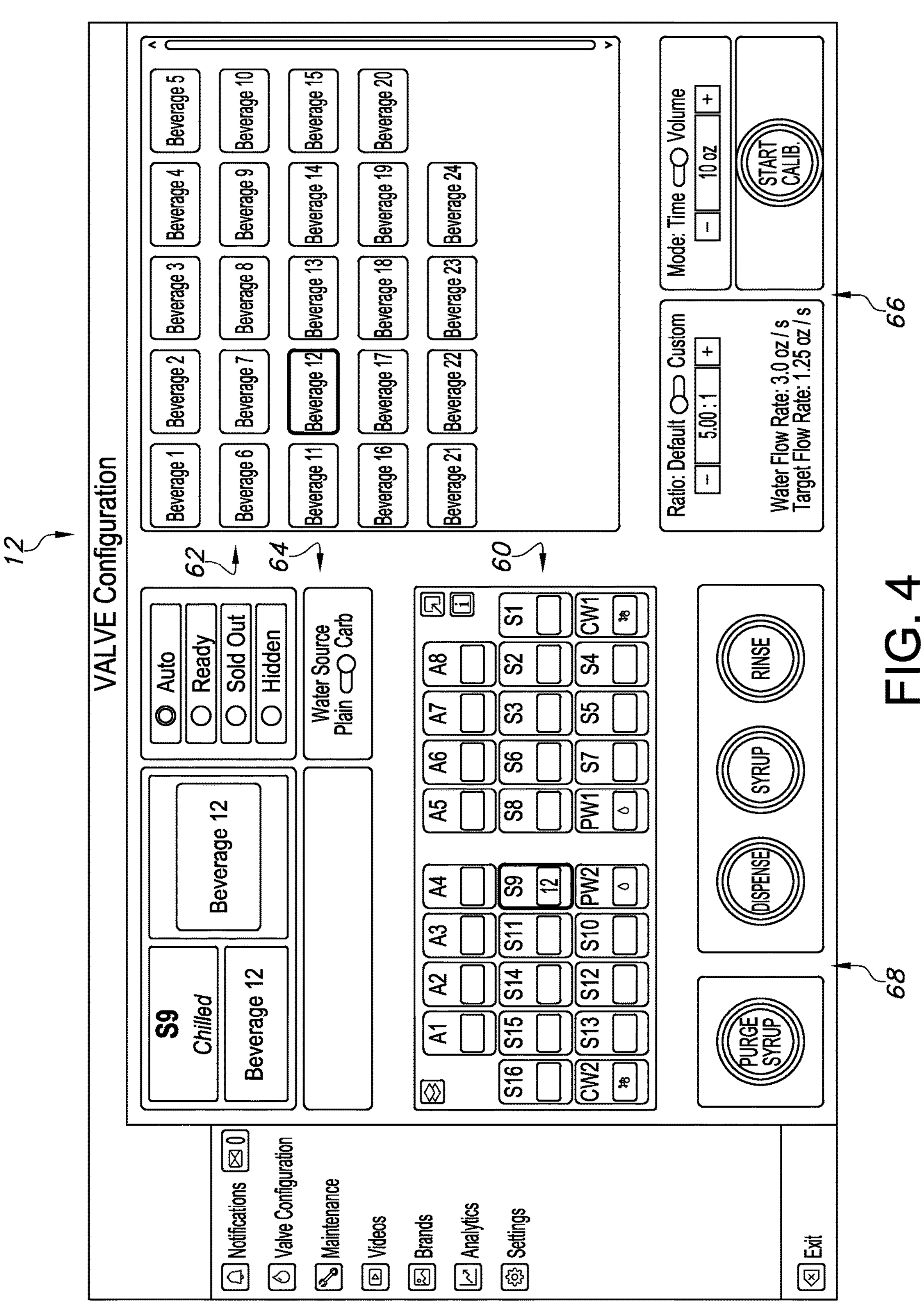

As shown in FIGS. 3 and 4, once a flow control icon is selected, for example S9 is shown as selected in FIG. 3, controller 14, which receives the selection, causes the functional sections 62-68 to be populated with options to configure and perform other operations with respect to the flow control element corresponding to the selected flow control icon, and with respect to the beverage component (or water) ultimately assigned to that flow control element. Each of these functional sections are presented on the same page of the user interface, thereby reducing time and "clicks", and providing an organized arrangement of information to facilitate efficient and accurate performance of tasks.

In the example to be discussed, functional section 62 includes a plurality of selectable beverage component icons, each corresponding to a beverage component that may be assigned to the selected flow control element (represented by S9 in this example). During initial set up or a later change, a particular beverage component is assigned to the flow control element corresponding to the selected flow control icon in response to the controller 14 receiving a non-customer user's selection, from functional section 62, of the beverage component icon corresponding to the particular beverage component. The beverage component represented by the selected icon of section 62 (shown with a highlighted border) is now assigned to the selected flow control element corresponding to S9, which, as shown in FIG. 4, can be indicated by its associated graphic appearing on the S9 icon (in the particular example shown, the beverage 12 indicator is shown on S9 to indicate the assignment, but the actual brand graphic used with the associated beverage component may be displayed on the S9 icon, such as, for example and without limitation, the brand graphic of Mountain Dew®, which is a registered trademark of PepsiCo, Inc.). The beverage component icons (in this or any example herein) may be presented in response to selection of one of the flow control icons, or may be pre-populated in their functional section. Because of the many available beverage components, a search or filter function may be provided to assist a user in locating and selecting the beverage component icon that represents the beverage component to be assigned to the flow control element represented by the selected flow control icon.

Figure 5:
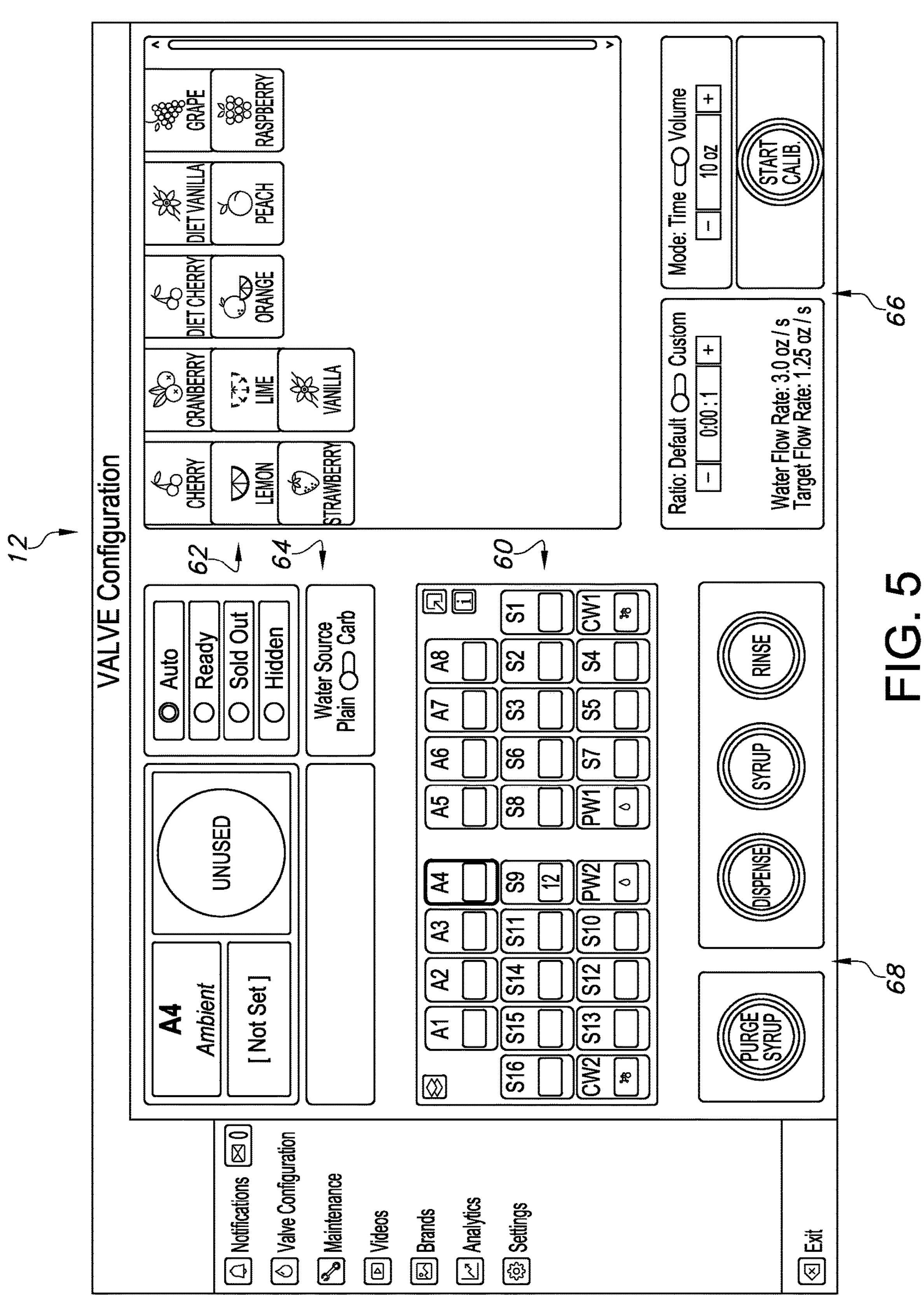
Figure 6:
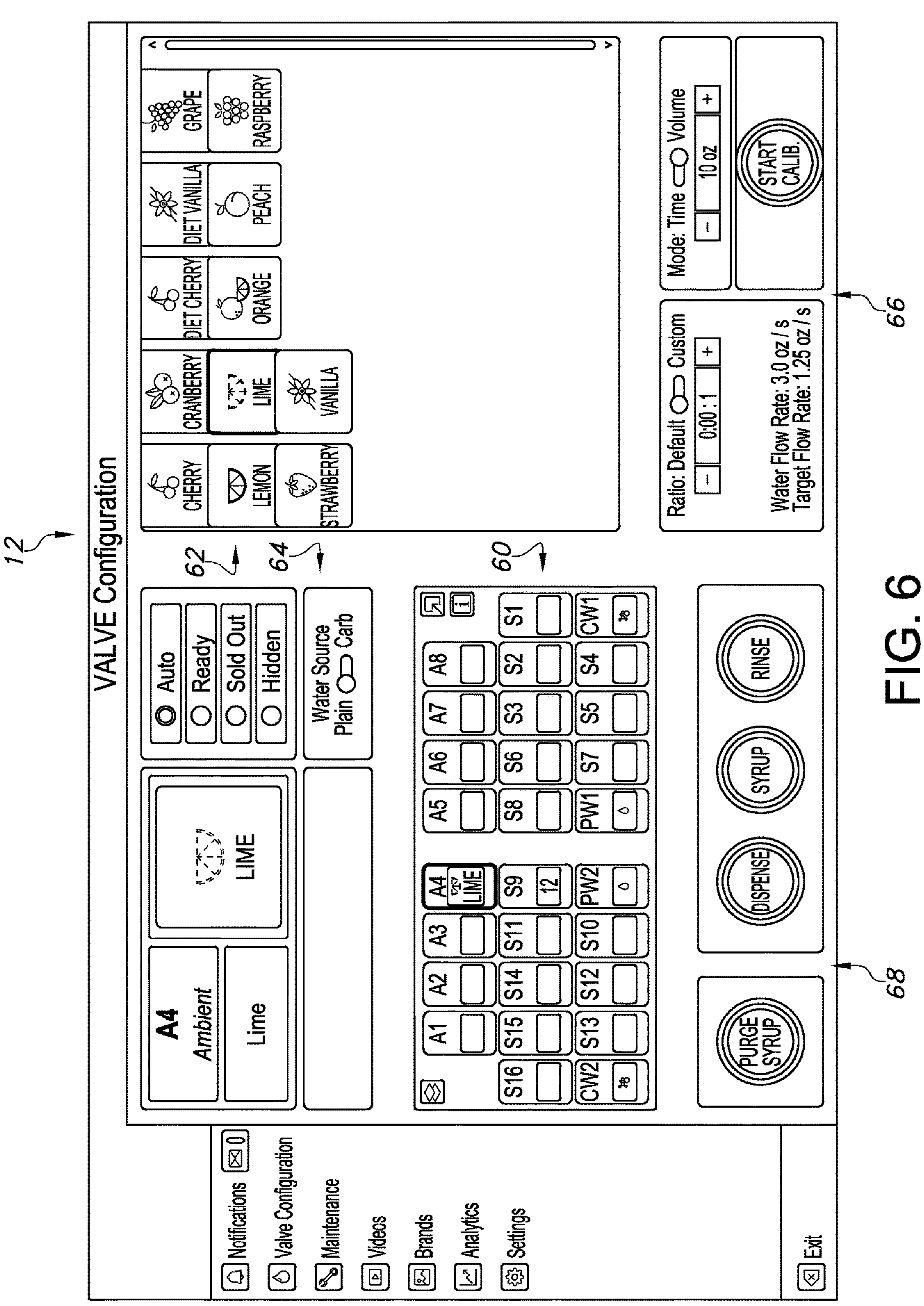

FIGS. 5 and 6 illustrate configuration of another flow control element, in this example that corresponding to icon A4 of array 60. In this example, A4 represents a flow control element for a bonus flavor beverage component, and thus when A4 is selected, as shown in FIG. 5, the controller 14 receives the selection and causes bonus flavor options (selectable bonus-flavor beverage component icons in the example shown) to appear in functional section 62. A particular bonus flavor is assigned to the flow control element represented by the selected A4 icon in response to controller 14 receiving the non-customer user's selection of the corresponding bonus-flavor beverage component icon from functional section 62. In the example of FIG. 6, the lime bonus flavor icon is selected, as shown with the icon's highlighted border, and assigned to the selected flow control element corresponding to A4, as indicated by its associated graphic appearing on the A4 icon.

Figure 7:
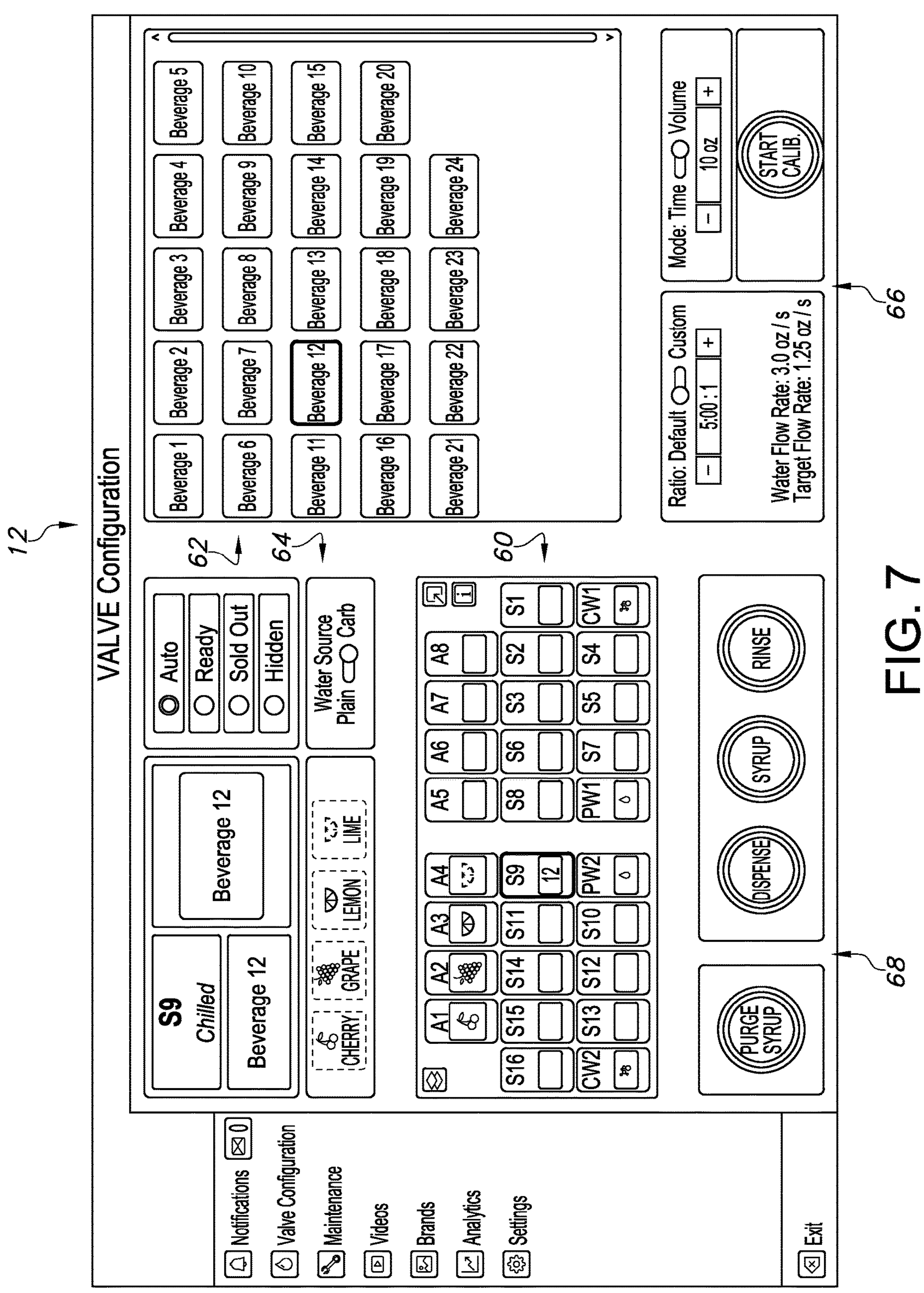
Figure 8:
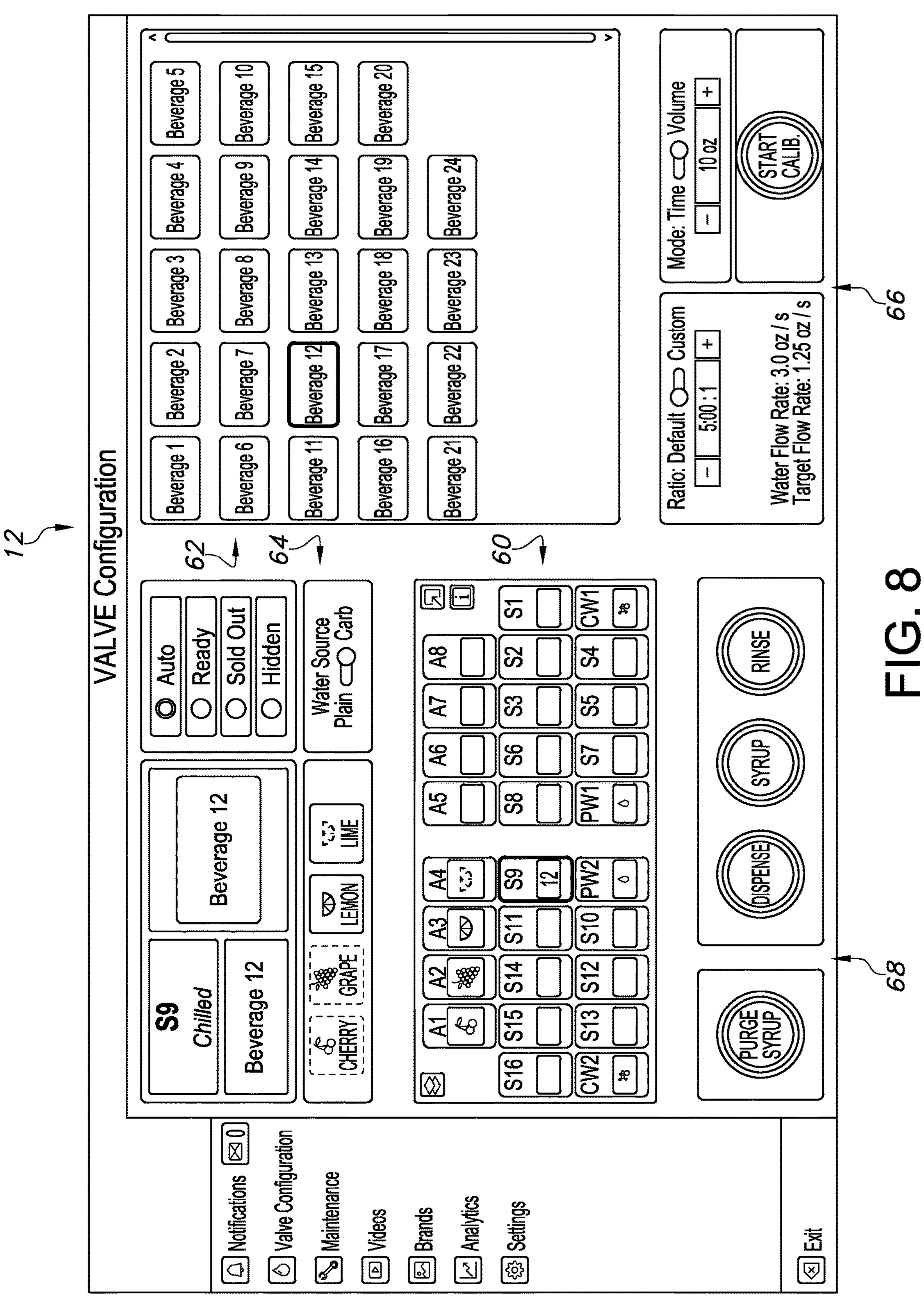

As shown in the examples of FIGS. 4, 6, 7, and 8, information and options related to the selected flow control element (corresponding to the selected flow control icon), or to the beverage component or water assigned to it, are shown in functional sections 64 and 66. In functional section 64, the non-customer user may configure certain choices in connection with the beverage component assigned the selected flow control element. For example, as shown in FIGS. 7 and 8, the non-customer user may choose which bonus flavors will be available to the customer along with the beverage assigned to the selected S9 flow control element. In particular, as shown in FIGS. 7 and 8, bonus flavors have been assigned to flow control elements represented by icons A1-A4, and these then appear as options in functional section 64. In FIG. 7 they are shown as unselected (grayed out). In FIG. 8, two of the choices, lemon and lime, and shown as selected (no longer grayed out), and will thus be available to choose by the customer.

Continuing with reference to functional section 64 of FIGS. 6-8, the non-customer user may also choose whether dispenser 10 will automatically handle certain situations, such as sold out conditions, for the beverage component corresponding to the selected flow control icon. Alternatively, the non-customer user may choose to override the automatic response with manual options, such as making the respective beverage available to the customer (ready), marking it as "sold out" for the customer to see, or hiding the choice from the customer. Functional section 64 may also be used to allow the non-customer user to select whether the beverage (corresponding to the beverage component associated with the selected flow control element) will use plain or carbonated water, and may be used to choose whether the beverage component is dispensed at ambient temperature, chilled, or heated. Also, section 64 may include a configuration option to set a specific carbonation level for the water to be dispensed with the selected beverage component (for example, between 0% (all plain water) and 100% (all carbonated water)), and, during dispense, controller 14 would use that configuration to control the plain and carbonated water flow control elements to deliver the corresponding ratio of the two waters. For some beverage components, not all the choices will be available, and the controller 14 may limit the configuration options in such cases. For example, and without limitation, a beverage component may be limited by its owner to combination with only certain bonus flavors, to require chilling, or to require it be mixed only with plain water or only with water having a prescribed carbonation level.

Figure 9:
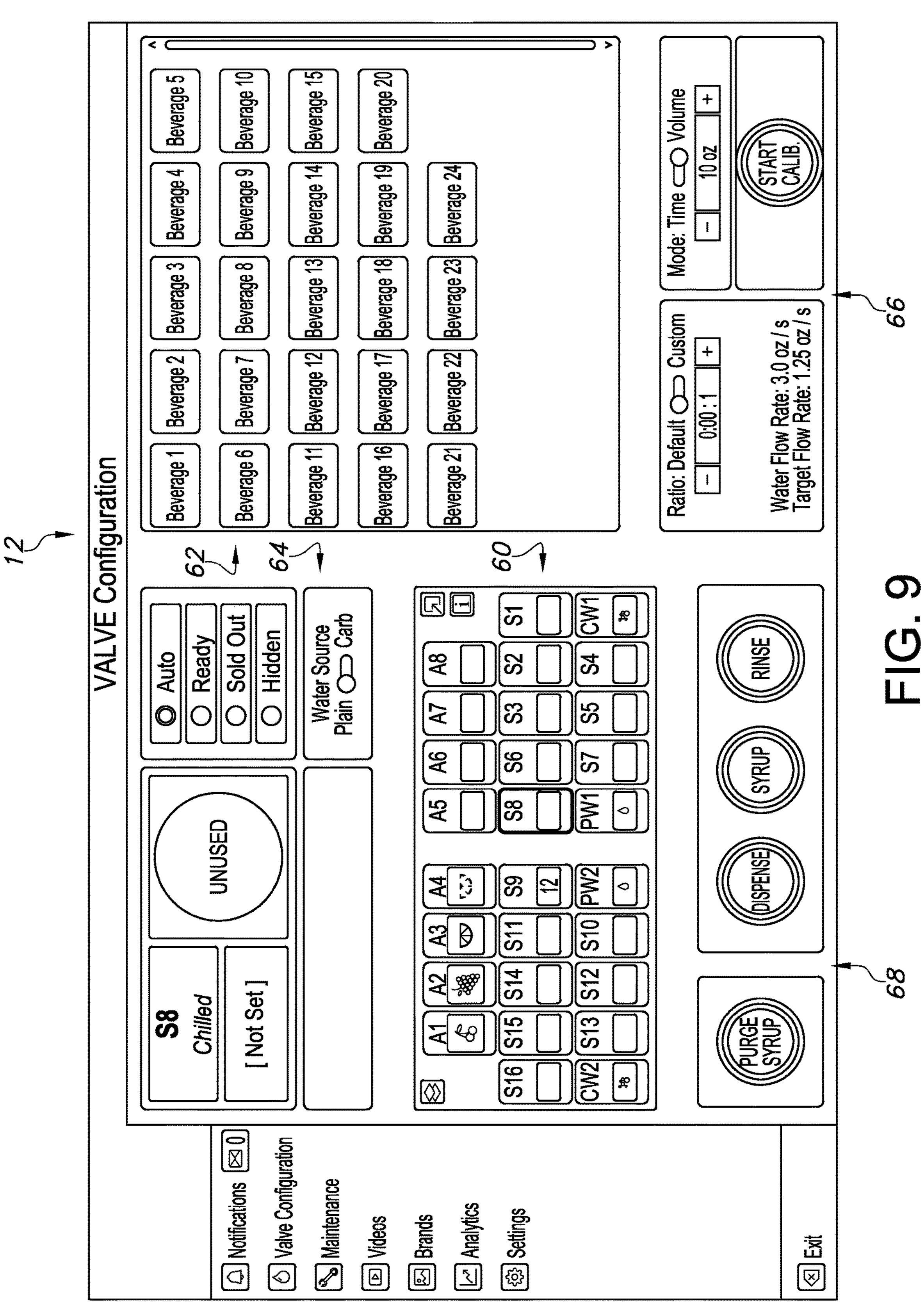
Figure 10:
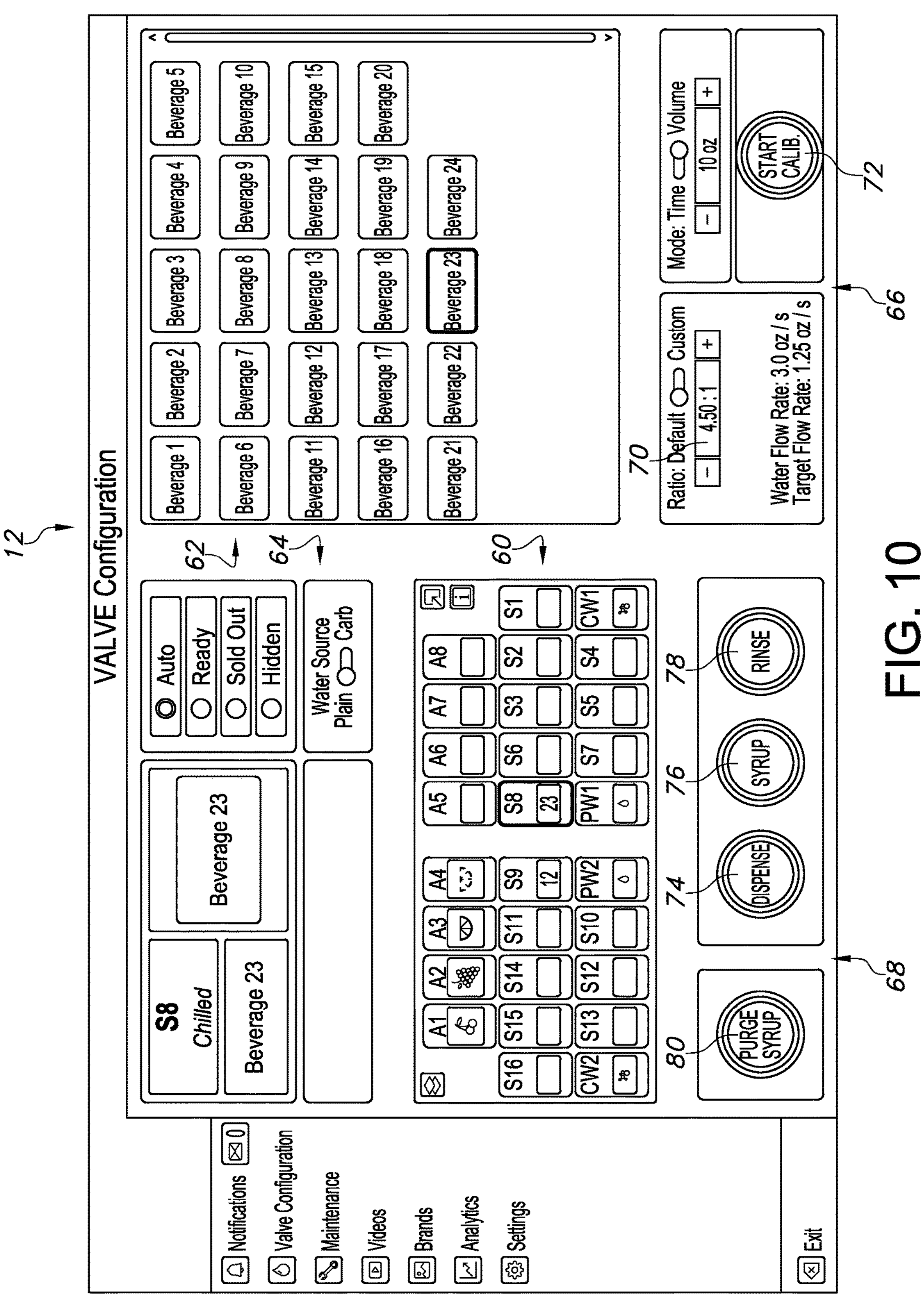

As another example, FIGS. 9 and 10 illustrate assignment of a beverage component to the flow control element corresponding to S8, by selecting the S8 icon from array 60 (FIG. 9) and then selecting the desired beverage component icon from functional section 62 (FIG. 10). In the example shown, a beverage component that uses plain water is selected (by selecting its corresponding beverage component icon—Beverage 23 in the present example) and thereby assigned to the flow control element represented by selected icon S8. As can be seen by comparing FIGS. 8 and 10, the selected water source (shown in functional section 64) and water ratio (shown in functional section 66) are different for the two respective beverage components illustrated in those FIGUREs.

For a beverage component assigned to a particular flow control element as discussed above, the controller 14 associates information related to the beverage component with the particular flow control element. This information may include, for example and without limitation, some or all of the following: graphical information, beverage component to water ratio information, information on the type of water to be mixed with the beverage component, information on dispense temperature, and information on any other beverage components that may be dispensed with the beverage component.

This information may be used in connection with the customer user interface or the non-customer user interface. For example, controller 14 may cause to be displayed, for customers, for beverages formed of one or more beverage components, beverage selection options for only those beverages for which corresponding beverage component information has been associated with flow control elements. As an example in connection with the non-customer user interface, controller 14 may cause information related to the assigned beverage component to be displayed on the associated icon from array 60, or in the functional sections 64 and 66 as discussed above and below.

The controller 14 uses the configuration selections to control the components of dispenser 10, and makes available applicable choices to the customer, to dispense customer-selected beverages according to the stored configurations. As one example, to dispense a customer-selected post-mix beverage that is made with a particular beverage component, controller 14 enables both the flow control element to which the beverage component is assigned and the water flow control element corresponding to the water source that was configured with functional section 64 (for example, plain or carbonated).

As shown in FIG. 10 (and others), functional section 66 allows adjustment of the ratio of water to beverage component for beverage components that are mixed with water (plain or carbonated), and calibration of the flow control elements. As shown in FIG. 10, the ratio can be automatically set, or manually entered in space 70. Calibration of a selected flow control element is facilitated with a calibration button 72. Typically, the water flow control elements (e.g., those represented by CW1, CW2, PW1, and PW2) would be first calibrated to achieve their target water flow rates. For each one, this is accomplished by selecting the corresponding flow control icon from array 60, then pressing the calibration button, which allows the water to flow for a desired time or volume, and measuring the actual flow rate. If it is not correct, the particular flow control element is adjusted until the flow rate is correct.

Once the water flow rates are correct, then calibration of any beverage component flow control element is accomplished by selecting, from array 60, the flow control icon corresponding to the flow control element to be calibrated. Ratio information for the beverage component assigned to the selected flow control element is displayed in functional section 66. Button 72 is engaged, which begins a metered (time or volume) dispense of the beverage component (and water if desired, in which case the beverage component and the water would be separately measured), and the user measures whether the flow rate (and therefore the ratio) is correct for the beverage component assigned to the flow control element being calibrated. If it is not, then the selected flow control element is adjusted until the ratio is correct.

As shown in FIG. 10 (and others), functional section 68 allows use of the non-customer user interface to perform various functions. In the example, shown, functional section 68 includes four buttons, "DISPENSE" "SYRUP", "RINSE", and "PURGE SYRUP." These allow functions that are commonly used by non-customer users of the dispenser 10. The DISPENSE button 74 dispenses the beverage component actually coupled to the selected flow control element (represented by S8 in this example) along with its associated water (if any), allowing a quick confirmation of whether the assigned beverage matches the one actually dispensed. SYRUP button 76 dispenses only the beverage component actually coupled to the selected flow control element, and RINSE button 78 dispenses only the water configured with the selected flow control element. In a particular embodiment, these three buttons are active only while depressed. The PURGE SYRUP button is like the SYRUP button, but is a toggle switch (remains engaged after being pressed until pressed again). These buttons may be used as may be needed. For example, and without limitation, the SYRUP and PURGE SYRUP buttons may be used when switching beverage components to purge the old beverage component from the line and draw the new one into the dispenser 10, or to clean a line with a cleaning solution.

When pressed, any button herein may be highlighted while it is engaged to acknowledge that it is engaged.

Figure 11:
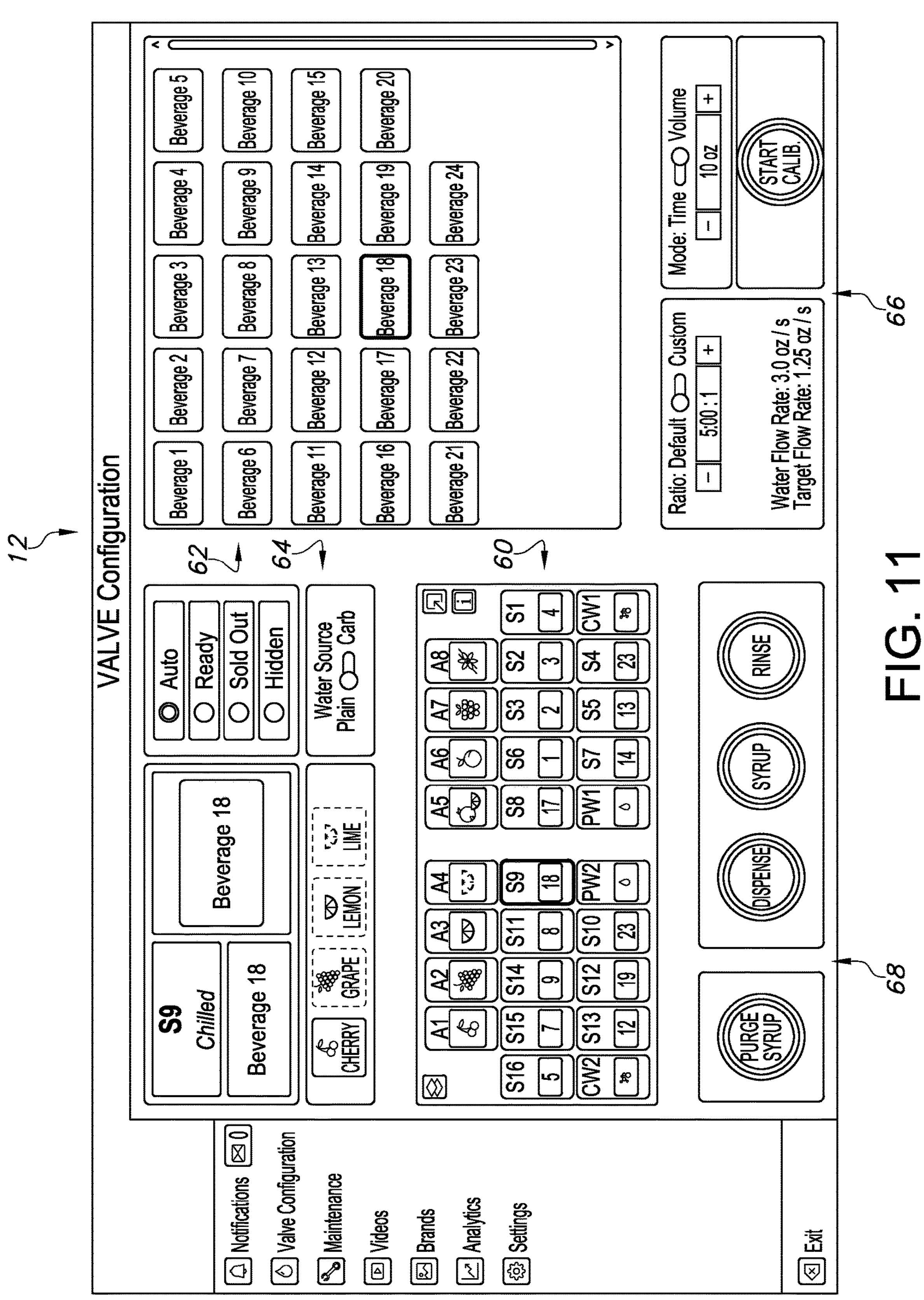

FIG. 11 shows an example of a dispenser having beverage components or water assigned to all the flow control elements. Although any graphical representation may be used on the flow control icons to represent the assigned beverage component, it is preferred to use the brand graphic associated with the assigned beverage component.

If it is later desired to change the beverage component that is assigned to a particular flow control element, the flow control icon corresponding to the flow control element is first selected from array 60 and the new beverage component is assigned to it in response to controller 14 receiving a non-customer user's selection of a corresponding beverage component icon from functional section 62. Once the assignment is made, the icon in array 60 is updated to graphically show the newly-assigned beverage component, information related to the beverage component is associated with the selected flow control element, and information and options in functional sections 64 and 66 are updated to reflect the newly assigned beverage component.

Controller 14 may, but need not, limit the configuration options for particular flow control elements. For example, and without limitation, no option to assign a beverage component may be presented when the PW1 icon is selected, although an option may be presented to dispense at chilled or ambient temperatures.

As can be seen from the foregoing, dispenser 10's configuration (and other functions) centers around selection of particular flow control icon, and then performing desired tasks related to the corresponding flow control and, once assigned, related to the beverage component assigned to it. These tasks are presented to the non-customer user in the functional sections 62-68.

As discussed above, the number of, options in, and arrangement of the functional sections is for example only, and more or fewer, in different locations, may be used, each with the more, fewer, or different functions. For example, the particular ice type (e.g., without limitation, cube, crescent, crushed, nugget, spherical, or any other ice type) used with the dispenser may be presented as a configurable option, whether in one of the shown functional sections or another one. Because of the different characteristics of different ice types, such as, without limitation, ice volume-to-surface area ratios, melting rates, and effective densities, it may be desirable to adjust the beverage component to water ratios of various beverages depending on the ice type used. Such adjustments may be made automatically based on the chosen ice type, or manually, for example, as discussed above in connection with FIG. 10. Similarly, for beverage dispensers that allow for portion control dispensing, the duration of beverage component dispensing or ice dispensing can be adjusted, automatically or manually, based upon the chosen ice type.

The various options (such as, without limitation, water type and beverage component to water ratio) for each beverage component may be initially set, automatically, to their preferred, or brand-owner required, states. Those initial settings may be changed, as described above, through the user interface of the present invention. Also, the ability to change some settings for certain beverage components may be disabled, for example if such changes are prohibited by the brand owner of the particular beverage component.

Also, the dispenser may be configured to provide different non-customer users with different profiles. A particular profile may or may not limit the user's ability to perform certain functions, and may be used to present the allowed information in a different format. For example, and without limitation, a technician may have the ability to perform any function, while maintenance personnel may not be allowed access to any beverage ratio functions and view a display that shows only flow control icons, the beverage component icons, and the beverage component configuration functional section. Also, the profile may include information on accessibility issues, such as, without limitation, color-blindness, and result in a change to the user interface color schemes to provide better accessibility.

Although the present invention has been described in detail, it should be understood that various changes, alterations, substitutions, additions, and modifications could be made without departing from the intended scope of the invention, as defined in the following claims.

What is claimed is:

1. A beverage dispenser system, comprising:

a plurality of beverage component flow control elements, each of the beverage component flow control elements coupled to a respective one of a plurality of beverage components;

a source of ice, the ice comprising a type of ice;

a water flow control element coupled to a source of water;

a user interface; and a controller coupled to the plurality of beverage component flow control elements, the water flow control element, and the user interface, the controller operable to cause a non-customer user page to be presented on the user interface, the non-customer user page comprising an ice type selection function.

2. The beverage dispenser of claim 1, wherein the controller is further operable to adjust a water-to-beverage component ratio of a beverage based on the type of ice selected with the ice type selection function.

3. The beverage dispenser of claim 1, wherein the controller is further operable to adjust a duration of beverage component dispensing or a duration of ice dispensing the ice based upon the type of ice selected.

4. The beverage dispenser system of claim 1, wherein the water is carbonated.

5. The beverage dispenser system of claim 1, wherein the non-customer user page further comprises:

a plurality of selectable flow control icons each corresponding to a respective one of the plurality of beverage component flow control elements; and a plurality of selectable beverage component icons each corresponding to a respective one of the plurality of beverage components, and wherein the controller is operable to associate information related to the respective one of the plurality of beverage components that corresponds to a selected one of the plurality of selectable beverage component icons with the one of the plurality of beverage component flow control elements that corresponds to a selected one of the plurality of selectable flow control icons;

such that, to dispense a requested beverage formed of a particular one of the plurality of beverage components, the controller is operable to control the one of the plurality of beverage component flow control elements with which the particular beverage component's information has been associated.

6. The beverage dispenser system of claim 5, wherein the beverage component icons are located in a functional section of the non-customer user interface, spaced apart from the flow control icons.

7. The beverage dispenser system of claim 5, wherein the non-customer user page further comprises a plurality of functional sections spaced apart from the flow control icons, and wherein the beverage component icons are located in one of the functional sections and the ice type selection function is located in another of the functional sections.

8. The beverage dispenser system of claim 5, wherein the water flow control element comprises a carbonated water flow control element wherein the source of water is a source of carbonated water, and further comprising a plain water flow control element wherein the source of water is a source of plain water, and wherein the non-customer user page further comprises a water type selection function for selecting plain or carbonated water, and the controller is further operable to associate respectively either the plain water flow control element or the carbonated water flow control element, depending on whether plain or carbonated water is selected with the water type selection function, with the respective one of the plurality of beverage components that corresponds to the selected one of the plurality of selectable beverage component icons.

9. The beverage dispenser system of claim 8, wherein the non-customer user page further comprises a plurality of functional sections spaced apart from the flow control icons, and wherein the beverage component icons are located in one of the functional sections and the water type selection function is located in another of the functional sections.

10. The beverage dispenser system of claim 5, wherein the information includes graphical information.

11. The beverage dispenser system of claim 5, wherein the information includes information about a water-to-beverage component ratio used to form a finished beverage.

12. A method of configuring a beverage dispenser system, comprising:

displaying, on a page, an ice type selection function;

receiving an ice type selection; and adjusting a water-to-beverage component ratio of a beverage based on the ice type selection.

13. The method of claim 12, and further comprising adjusting a duration of beverage component dispensing or a duration of ice dispensing ice based upon the ice type selection.

14. The method of claim 12, and further comprising:

displaying, on the page, a plurality of selectable flow control icons each corresponding to a respective beverage component flow control element;

receiving a selection of one of the flow control icons;

displaying on the page, in response to receiving the selection of one of the flow control icons, a plurality of selectable beverage component icons each corresponding to a respective one of a plurality of beverage components; and assigning one of the plurality of beverage components to the beverage component flow control element that corresponds to the selected flow control icon in response to receiving a selection of the beverage component icon that corresponds to the beverage component to be assigned, such that information related to the assigned beverage component is associated with the beverage component flow control element that corresponds to the selected flow control icon.

15. The method of claim 14, and further comprising locating the beverage component icons on the page in a functional section spaced apart from the flow control icons.

16. The method of claim 14, wherein the page further comprises a plurality of functional sections spaced apart from the flow control icons, and wherein the beverage component icons are located in one of the functional sections and the ice type selection function is located in another of the functional sections.

17. The method of claim 14, and further comprising:

displaying a water type selection function for selecting plain or carbonated water;

receiving a water type selection;

associating the selected water type with the respective one of the plurality of beverage components that corresponds to the selected one of the plurality of selectable beverage component icons.

18. The method of claim 17, wherein the page further comprises a plurality of functional sections spaced apart from the flow control icons, and wherein the beverage component icons are located in one of the functional sections and the water type selection function is located in another of the functional sections.

19. The method claim 14, wherein the information includes graphical information.

20. The method claim 14, wherein the information includes information about the water-to-beverage component ratio used to form a finished beverage.

* * * * *